(12) United States Patent
Ganguly et al.

(10) Patent No.: US 8,176,485 B2
(45) Date of Patent: May 8, 2012

(54) LAUNCHING HYPERVISOR UNDER RUNNING OPERATING SYSTEM

(75) Inventors: Shuvabrata Ganguly, Seattle, WA (US); Andrew J. Thornton, Seattle, WA (US); John F. Wiederhirn, Redmond, WA (US); Kenneth D. Ray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1424 days.

(21) Appl. No.: 11/383,455

(22) Filed: May 15, 2006

(65) Prior Publication Data

US 2007/0266389 A1 Nov. 15, 2007

(51) Int. Cl.
*G06F 9/455* (2006.01)
(52) U.S. Cl. .......................................... 718/1
(58) Field of Classification Search .................. None
See application file for complete search history.

(56) References Cited

U.S. PATENT DOCUMENTS

| | | | |
|---|---|---|---|
| 6,530,078 B1 | 3/2003 | Shmid et al. | |
| 6,567,933 B1 * | 5/2003 | Swoboda et al. | 714/31 |
| 6,883,073 B2 | 4/2005 | Arakawa et al. | |
| 6,892,383 B1 | 5/2005 | Arndt | |
| 7,093,239 B1 * | 8/2006 | van der Made | 717/135 |
| 7,865,893 B1 * | 1/2011 | Omelyanchuk et al. | 718/1 |
| 2004/0139437 A1 | 7/2004 | Arndt | |
| 2005/0055192 A1 | 3/2005 | Traut | |
| 2005/0160423 A1 * | 7/2005 | Bantz et al. | 718/1 |
| 2006/0070065 A1 * | 3/2006 | Zimmer et al. | 718/1 |
| 2006/0136667 A1 | 6/2006 | Shultz et al. | |
| 2007/0022427 A1 | 1/2007 | Arndt | |

FOREIGN PATENT DOCUMENTS

| | | |
|---|---|---|
| WO | WO 02/056172 A2 | 7/2002 |
| WO | WO 02/097624 A2 | 12/2002 |

OTHER PUBLICATIONS

Lim, B-H., "A Hosted Virtual Machine Architecture", http://www.usenix.org/event/usenix01/sugerman/sugerman_html/node3.html, 2001, 2 pages.

Abstract of RU 2259582 C2, published Aug. 27, 2005, Stefen Chou, et al.

USENIX Association; Proceedings of the Third Virtual Machine Research and Technology Symposium; San Jose, CA, USA, May 6-7, 2004.

Virtual Machine Interface (VMI); VMWARE, Paravirtualization API, pp. 1-10, http://www.vmware.com/standards/vmi.html, Feb. 24, 2006.

* cited by examiner

*Primary Examiner* — Emerson Puente
*Assistant Examiner* — Gregory Kessler
(74) *Attorney, Agent, or Firm* — Woodcock Washburn LLP

(57) ABSTRACT

The launching of a hypervisor after there is already a running operating system. The operating system itself may launch the hypervisor. The running operating system may be used instead of the hypervisor to discover the physical resources running on the computing system. Other operating systems or operating system instances may be launched after the hypervisor is operational.

20 Claims, 5 Drawing Sheets

LAUNCHING HYPERVISOR UNDER RUNNING OPERATING SYSTEM

BACKGROUND

One of the primary functions of an operating system is to interface with physical resources on a computing system. A typical operating system might guard against accessing the physical resources in an inappropriate manner. For example, when one application is using a particular segment of memory, the operating system may protect that segment of memory from being altered by another application managed by that same operating system. Otherwise, the applications might not function as expected. Such access guards are often based on the assumption that the operating system is the only operating system running on the computing system.

However, sometimes it can be advantageous to run multiple operating systems on the same computing system. In that case, the implicit protections in each operating system to ensure safe operation with resources may no longer be sufficient. An operating system may not be able to control the accessing of the same physical resources by another operating system, and may not even have a mechanism for becoming aware of the existence of that other running operating system.

A hypervisor is a software layer that is configured to be interposed between one or more running operating systems and protected physical resources (such as processors, I/O ports, memory, interrupts, etc.). The hypervisor functionally multiplexes the protected physical resources for the operating systems, and manifests the resources to each operating system in a virtualized manner. For instance, as a simple example, suppose that there are two operating systems running on a computing system that has one processor and 1 Gigabyte (GB) of Random Access Memory (RAM). The hypervisor may allocate half of the processor cycles to each operating system, and half of the memory (512 Megabytes (MB) of RAM) to each operating system. Furthermore, the hypervisor may provide a virtualized range of RAM addressed to each operating system such that it appears to both operating systems that there is only 512 MB of RAM available.

When the operating system attempts to communicate with a physical resource and vice versa, the hypervisor performs appropriate buffering and transformations to allow each operating system to experience its environment as though it was the only operating system running on the computing system. Furthermore, the hypervisor does this is a manner that the physical resources on the computing system may be shared by multiple operating system instances while still being protected.

Traditionally, hypervisors are launched prior to running an operating system. This allows the hypervisor to start the operating system in a virtual machine by presenting a virtualized view of the physical resources. In order to immediately start the operating system in the virtual machine, the hypervisor includes extensive code for discovering the physical resources and their essential characteristics. Since physical resource discovery is done before there are any running operating systems, the operating system cannot be relied upon in this discovery process. Accordingly, the code for discovering physical resources in a hypervisor may be quite complex.

BRIEF SUMMARY

Although the principles of the present invention are not limited to the embodiments summarized in this brief summary, some embodiments described herein relate to the launching of a hypervisor after there is already a running operating system. Although not required, the running operating system may be used instead of the hypervisor to discover the physical resources running on the computing system. Thus, if desired, the hypervisor may rely on the operating system to discover the resources, rather than having to have code that performs the same functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In accordance with embodiments of the present invention, a hypervisor may be launched after there is already a running operating system. The running operating system may be used instead of the hypervisor to discover the physical resources running on the computing system. Other operating system instances may be launched after the hypervisor is operational. A general computing environment in which the principles of the present invention may be practiced will first be described with respect to FIG. 1. Then, further details regarding embodiments of the present invention will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
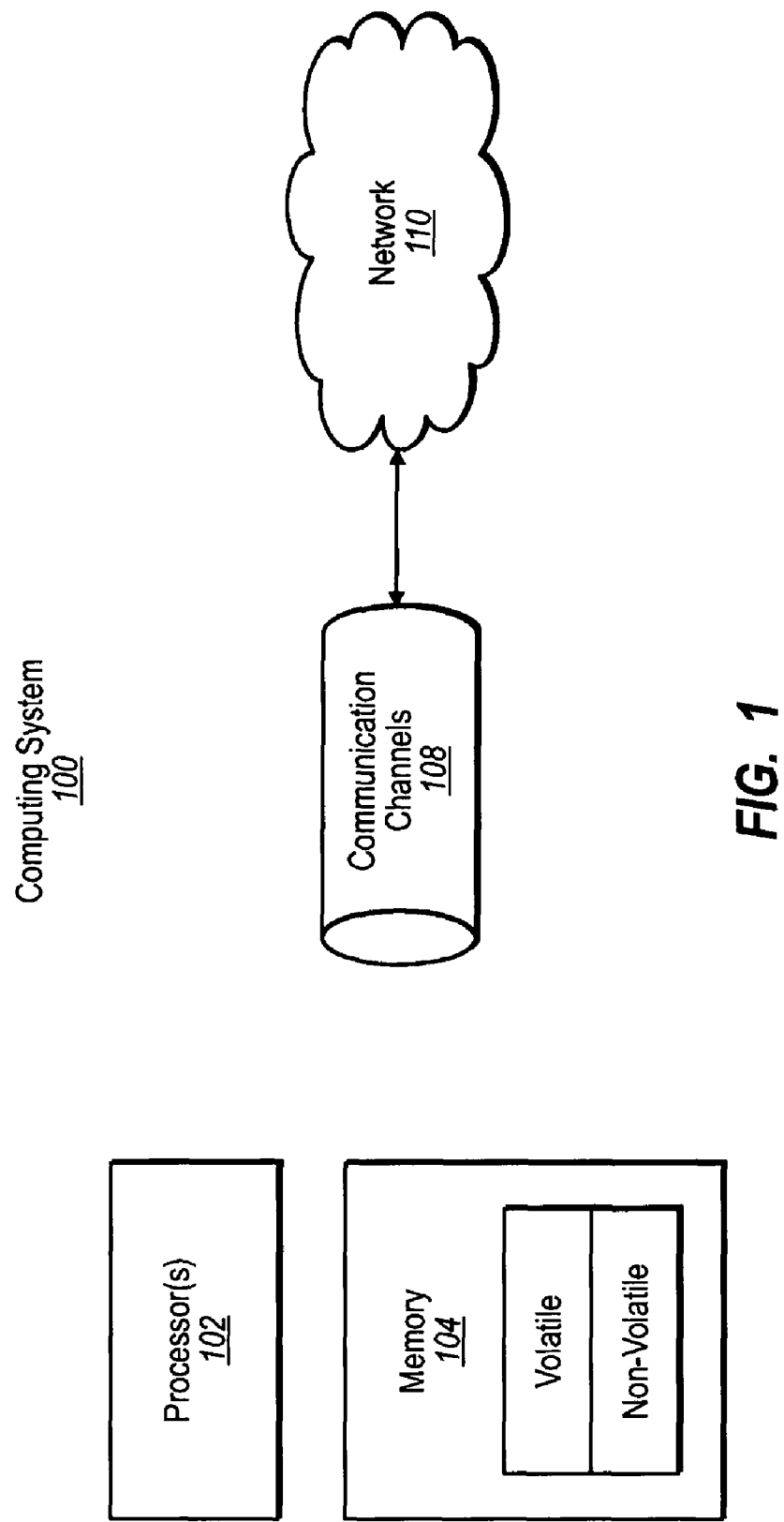
FIG. 1 illustrates a computing environment in which embodiments of the present invention may be employed.

Referring to FIG. 1, in its most basic configuration, a computing system 100 typically includes at least one processing unit 102 and memory 104. The memory 104 may be physical system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
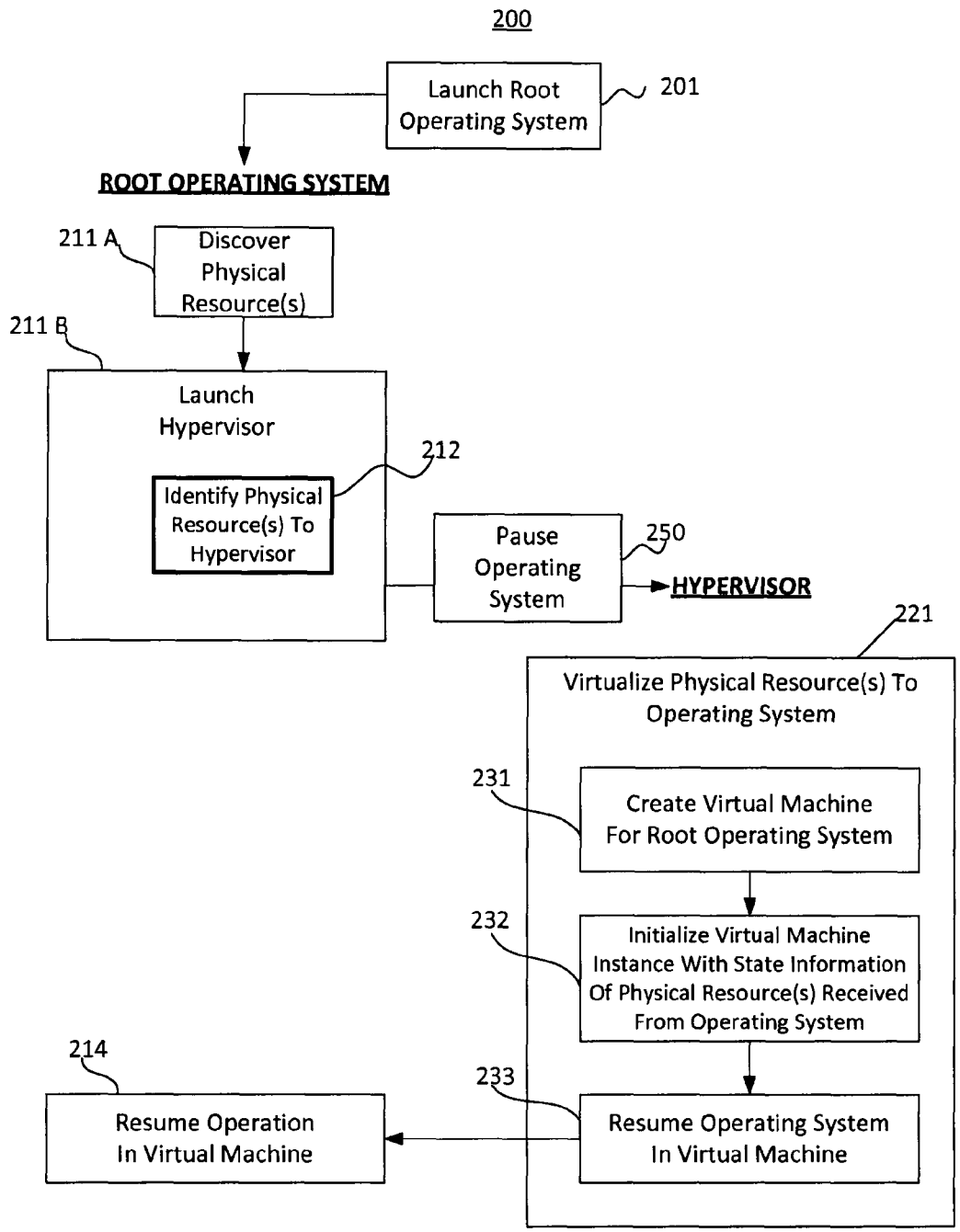
FIG. 2 illustrates a flowchart of a method for launching a hypervisor using a running operating system.

FIG. 2 illustrates a flowchart of a method 200 for a running operating system to launch a hypervisor. In this description and in the claims, a "hypervisor" is a software layer that is configured to be disposed between one or more running operating systems and protected physical resources. The hypervisor functionally multiplexes the protected physical resources for the operating systems, and manifests the resources to each operating system in a virtualized manner. Thus, the hypervisor acts as a special kind of abstraction layer between the operating system and the physical resources of the computing system.

For instance, as a simple example, suppose that there are two operating systems running on a computing system that has one processor and 1 Gigabyte (GB) of Random Access Memory (RAM). The hypervisor may allocate half of the processor cycles to each operating system, and half of the memory (512 Megabytes (MB) of RAM) to each operating system. Furthermore, the hypervisor may provide a virtualized range of RAM addressed to each operating system such that it appears to both operating systems that there is only 512 MB of RAM available. When the operating system attempts to communicate with a physical resource and vice versa, the hypervisor performs appropriate buffering and transformations to allow each operating system to experience its environment as though it was the only operating system running on the computing system.

Unlike conventional hypervisor configurations, embodiments of the present invention permit the hypervisor to be launched after the operating system has been launched, even if the operating system has already discovered the physical resources of the computing system. The operating system that starts the hypervisor passes information representing the state of the discovered physical resources to the hypervisor. Thus, the hypervisor need not have separate code to discover the physical resources of the computing system.

Once the operating system launches the hypervisor and passes to the hypervisor information regarding the discovered physical resources of the computing system, the operating system may pause execution 250 and pass control to the hypervisor. The hypervisor could then set up a virtual machine instance to handle future access requests to any protected resources of the computing system's physical resources. The virtual machine instance is initialized with state that is consistent with the operating system's concept of the protected physical resources. When this is accomplished, the operating system resumes in the virtual machine environment. In the virtual machine environment, however, the operating system interfaces with the physical resources indirectly through the hypervisor, rather than directly with the physical resources. The change is transparent to the operating system since the virtual machine that is dedicated to communication with the operating system honors the information the operating system had previously discovered about the physical resources.

In some cases and for some of the protected physical resources, it may not be possible for the operating system to discover a protected physical resource without the use of the hypervisor, and then interface later indirectly with that same protected physical resource through the hypervisor in a transparent manner. In that case, the operating system may be configured to understand that it might later be operating through a hypervisor, and to thus ignore any of the physical resources that cannot later be virtualized in a transparent manner. For instance, the operating system loader may be configured to inform other operating system components not to use particular protected physical resources.

Figure 4C:
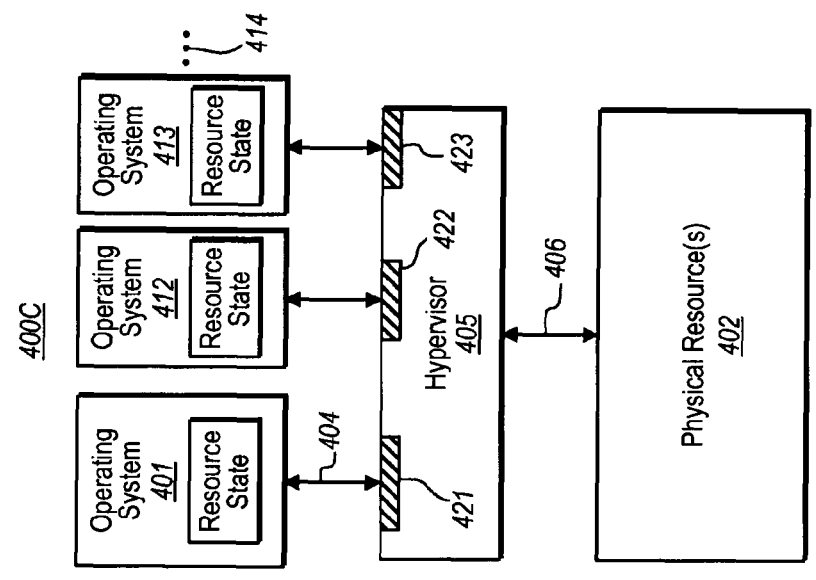
FIG. 4C illustrates a configuration in which additional operating systems have been launched and supported by the hypervisor.
Figure 4B:
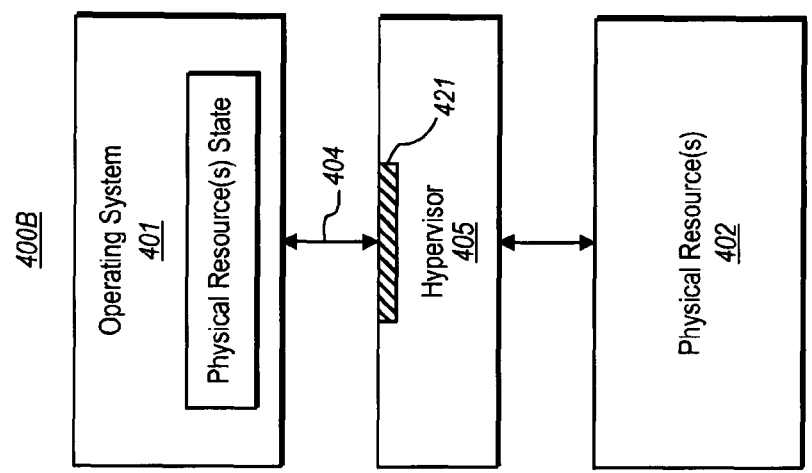
FIG. 4B illustrates a configuration in which the operating system has launched a hypervisor to act as an intermediary between the operating system and the physical resources.
Figure 4A:
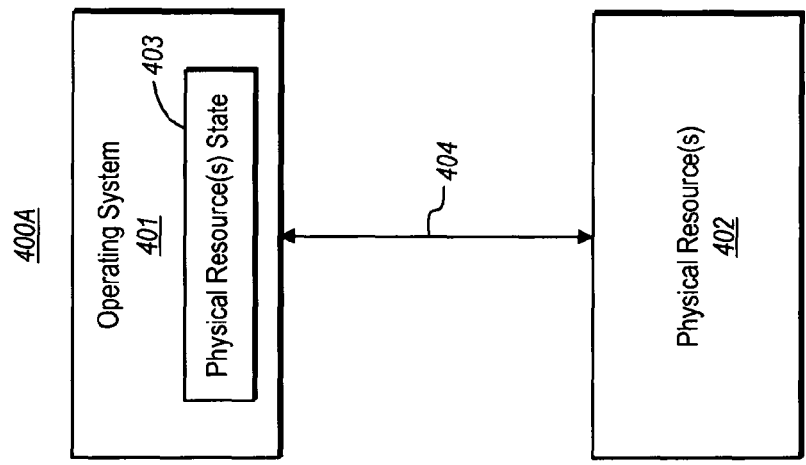
FIG. 4A illustrates a configuration in which a root operating system, in the absence of a hypervisor, is in direct communication with physical resources of the computing system.

Referring back to FIG. 2, the method 200 begins when the root operating system is launched (act 201). A "root" operating system is the operating system that launches the hypervisor, as contrasted with operating systems that may be launched after the hypervisor is operational. FIG. 4A illustrates a configuration 400A at this stage of operation in which the operating system 401 communicates directly 404 with the physical resources 402 of the computing system in the absence of a hypervisor.

The root operating system then performs several acts that are illustrated in the left column of FIG. 2 under the column header "ROOT OPERATING SYSTEM". For instance, the root operating system discovers at least one physical resource (act 211A). Operating systems typically have instructions that discover the physical resources of the computing system that are executed soon after launching the operating system. Referring to FIG. 4A, for example, the operating system 401 discovers physical resource state 403. Discovering physical resources of a computing system can be a complex task.

In order to resume the operating system in the state before the launch of the hypervisor, the operating system captures the state of the physical machine prior to the launching the hypervisor. In one embodiment, the captured state includes the state of all the physical processors and the physical APICs. The physical processor state includes:

1. General purpose registers.
2. Floating point and XMM registers.
3. Control registers (CRs).
4. Debug registers (DRs)
5. Instruction Pointer (RIP), Stack Pointer (RSP) and Flags Register (RFLAGS).
6. Segment state for CS, DS, SS, ES, FS, GS and TR segments including the segment bases, limits and access rights.
7. The Global Descriptor Table Register (GDTR), Interrupt Descriptor Table Register (IDTR) and Local Descriptor Table Register (LDTR).
8. Certain model specific registers (MSRs) which includes KernelGsBase, Star, Lstar, Cstar, Sfmask, SysenterCs, SysenterEip, SysenterEsp and ApicBase MSRs.

The physical Local APIC state may includes:

1. Local APIC ID
2. In-Request-Register (IRR)
3. In-Service-Register (ISR)
4. Task Priority Register (TPR)

In addition some other aspects of the hardware may be provided to the hypervisor as boot parameters when the hypervisor is launched. These might include:

1. Present and potential logical processors, including those that may be hot-plugged at runtime
2. Whether hyperthreading is enabled or disabled in the BIOS
3. Present Physical RAM ranges—system physical address ranges that are populated with RAM at the time the hypervisor is booted
4. Physical nodes (including those that have no associated resources at boot time but may be populated at runtime)
5. Memory access ratios between physical nodes
6. Addresses of certain hardware features that the hypervisor must access (e.g. the power management timer)

The operating system also launches the hypervisor (act 211B) that is to be interposed between the operating system and the physical resources. For instance, referring to FIG. 4B, the hypervisor 405 is interposed between the root operating system 401 and the physical resources 402. As part of this launching, the operating system provides state information for at least the physical resources to be protected to the hypervisor (act 212). This state information includes all the information that a hypervisor would need to discover the relevant state of the protected physical resources that are to be guarded by the hypervisor. In one embodiment, the state information might include the capture state described above. At the very least, the state information includes at least an identification of the corresponding physical resources.

Also, as part of the launch, the operating system passes control to the hypervisor. The hypervisor then performs acts as illustrated in the right column of FIG. 2 under the heading "HYPERVISOR". In particular, the hypervisor then performs tasks necessary to virtualize the protected physical resources of the computing system to the root operating system (act 221).

For instance, the hypervisor may create a virtual machine instance for the root operating system (act 231). Referring to FIG. 4B, block 421 represents a virtual machine instance for the operating system 401. Once initialized and operational, the virtual machine instance 421 will serve as a proxy for the physical resources 402 for the operating system 401. The virtual machine instance 421 will receive service requests from the operating system 401 for the physical resources, and will perform appropriate transformations and buffering of the requests depending on the state information accessible to the virtual machine instance 421. The virtual machine instance 421 will then cause the hypervisor 405 to request the appropriate service from the physical resources 402. The virtual machine instance 421 will potentially also report back the results of the request to the operating system 401 with appropriate transformations and buffering as needed.

The virtual machine instance 421 will behave differently depending on the state information accessible to the virtual machine instance. The hypervisor honors the state information that the operating system 401 has already discovered regarding the physical resources 402. Accordingly, the hypervisor 405 initializes the virtual machine instance 421 with at least some of the state information provided by the operating system (act 232). For instance, the hypervisor 405 may initialize the virtual machine with the capture state provided by the operating system. In this manner, the virtual machine instance 421 is initialized with state consistent with the information representing the physical resources detected by the operating system. The operating system is then resumed in the virtual machine environment (act 233 and act 214). In this environment, as seen in FIG. 4B, instead of the operating system 401 interfacing directly with the physical resources 402, the physical resources 402 are virtualized for the operating system 401 through the use of the virtual machine instance 421 and the hypervisor 405. Since the state information used by the virtual machine 421 is consistent with the state information discovered by the operating system 401, the change is transparent to the operating system 401 is some embodiments.

In one embodiment, the virtualization is provided via a virtual processor abstraction which emulates the behavior of the physical processor. Similarly it provides a virtual APIC which emulates the behavior of the physical APIC. This is achieved as follows:

1. The state of the virtual processor is initialized to the captured state of the physical processor.

2. The state of the virtual APIC is initialized to the captured state of the physical Local APIC.

3. The hypervisor installs intercepts to prevent the operating system from accessing privileged physical hardware resources. For example, the guest physical address where the local APIC was previously located prior to launching the hypervisor is marked as not present so that all accesses to the local APIC are trapped into the hypervisor.

Figure 3:
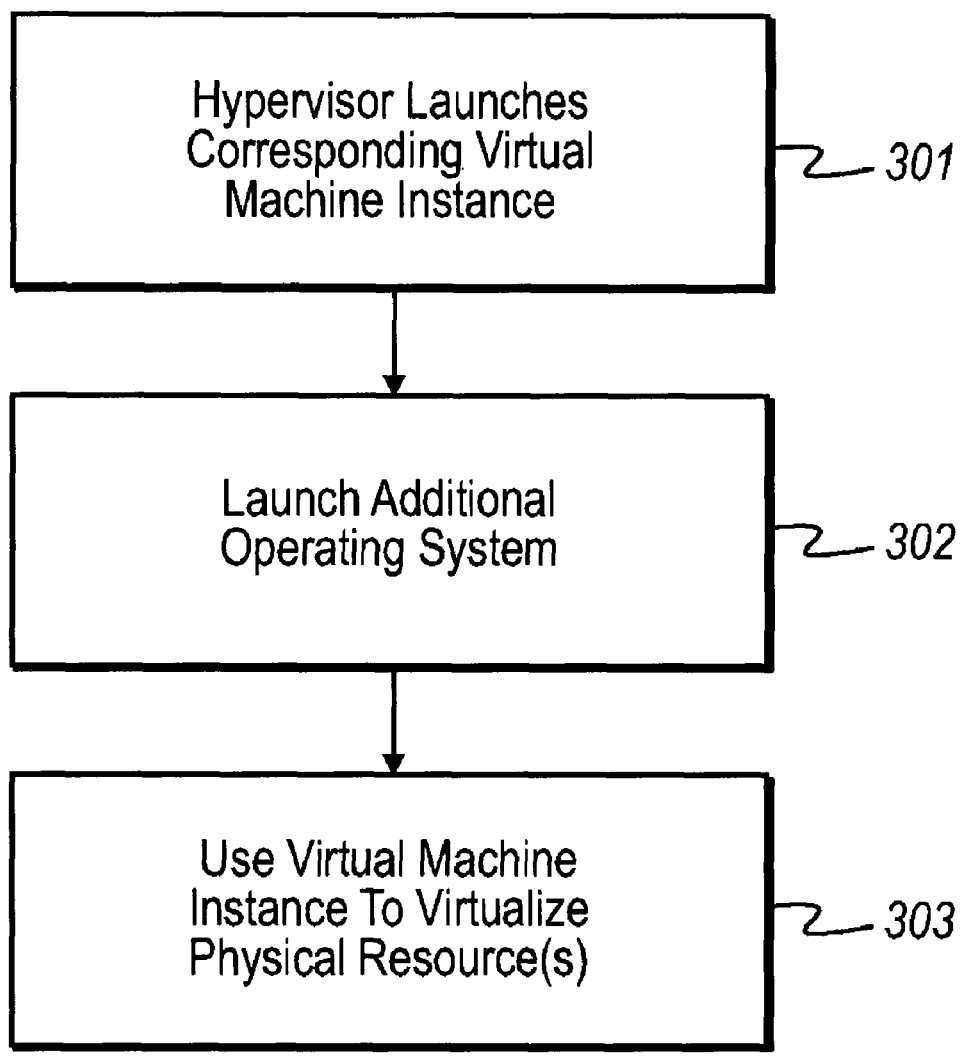
FIG. 3 illustrates a flowchart of a method for launching additional operating system instances.

After the hypervisor is launched, the hypervisor may launch additional operating systems, either instances of the same operating system, or instances of different operating systems. For example, referring to FIG. 4C, operating systems 412 and 413 amongst potentially others as represented by the ellipses 414 may additionally be launched. FIG. 3 illustrates a flowchart of a method 300 for virtualizing physical resources to the additional operating systems as well. When an additional operating system is to be launched, the hypervisor first launches a corresponding virtual machine instance (act 301), through which the operating system is then launched (act 302). The hypervisor uses the corresponding virtual machine instance to virtualize the physical resource(s) to the corresponding additional operating system (act 303).

When each operating system performs discovery of the physical resources upon starting up the operating system, the various requests for information are intercepted by the corresponding virtual machine instance. Instead of finding out the actual state information associated with the physical resources, the corresponding virtual machine provides virtualized state information to the operating system.

Sometimes, the operating system that launches the hypervisor may be in a different environment type. For instance, perhaps the operating system is operating in 32-bit mode, whereas the hypervisor to be launched is to operate in 64-bit mode, or vice versa. Similarly, the operating system and the hypervisor may be operating in different paging modes. Some embodiments of the present invention allow the operating system to launch the hypervisor even if the operating system and hypervisor are operating in different environments.

Figure 5:
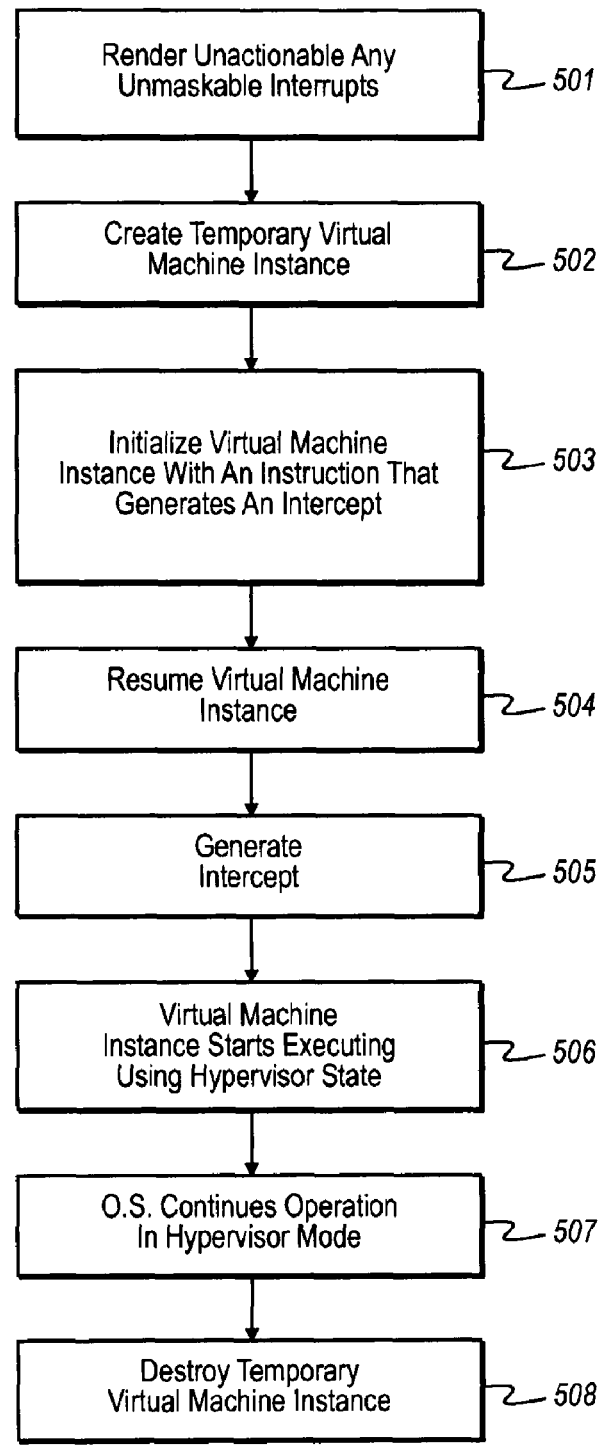
FIG. 5 illustrates a flowchart of a method for transporting the operating system to the environment of the hypervisor.

FIG. 5 illustrates a flowchart of a method 500 for the operating system to enter the environment of the hypervisor in preparation for launching the hypervisor. From act 201 of FIG. 5 in which the operating system is launched, the operating system first renders inactionable any non-maskable interrupts (act 501), and masks any maskable interrupts. Non-maskable interrupts may be rendered inactionable in a number different ways. After all, when the operating system is in transition to the hypervisor operating environment, care should be taken to ensure that no interrupts or exceptions occur before the initial state of the hypervisor is loaded. If an interrupt or exception occurs after leaving the operating system environment but before entering the hypervisor environment the processor will probably not be able to handle the interrupt or exception since there is no interrupt descriptor table or a stack. Most exceptions can easily be avoided since they are software initiated. Maskable hardware interrupts can inhibit during this process by clearing the IF bit in the RFLAGS register.

Non-maskable interrupts (NMIs) can be inhibited by either of the two mechanisms:

1. Self deliver an NMI and do not execute an IRET instruction: This can be achieved by temporarily modifying the NMI handler address in the operating system's interrupt descriptor table to point to a different handler. Then an NMI can be delivered to the current processor. This will cause the processor to jump to the address provided as the NMI handler. In the NMI handler, we can restore the original NMI handler address and continue. This will effectively mask further NMIs since on the x86 architecture NMIs are masked after an NMI is received until an IRET instruction is executed.

2. Always run with a valid interrupt descriptor table (IDT) and stack: This can be achieved by creating a temporary IDT and stack. The temporary page tables can map the temporary-IDT, the NMI handler and stack at their original virtual addresses and their respective physical addresses. This ensures that if an NMI arrives when the processor is running with the temporary page tables it will be correctly delivered to the handler.

Once the interrupts are masked or otherwise rendered inactionable (act 501), a temporary virtual machine instance is created (act 502). The operating system then initializes the temporary virtual machine instance with an instruction that causes an intercept (act 503). An intercept is a transfer of control from the operating system to the hypervisor. When the temporary virtual machine instance is resumed (act 504), the virtual machine instance executes the instructions that causes the intercept, and the intercept is thus generated (act 505). Consequently, the temporary virtual machine instance starts executing using the hypervisor state (act 506), thereby causing the operating system to continue operation in hypervisor mode (act 507). The operating system may then launch the hypervisor. Optionally, the temporary virtual machine instance may be destroyed (act 508), since it was only needed to put the operating system into the hypervisor mode necessary to launch the hypervisor.

Accordingly, embodiments of the present invention permit a hypervisor to be launched even after there is already a running operating system present on the computing system. In some embodiments, the operating system may launch the hypervisor even if the operating system and hypervisor are in different environments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-readable storage medium for using a running operating system to launch a hypervisor, bearing computer-readable instructions that, upon execution by a computer, cause operations comprising:
   launching, by the operating system, the hypervisor;
   discovering, by the operating system, a physical resource of the computer;
   providing, by the operating system, state information for the physical resource to the hypervisor, the state information including at least an identification of the physical resource;
   pausing the operating system;
   launching, by the hypervisor, a virtual machine instance for the operating system;

initializing the virtual machine instance with state consistent with the state information;
resuming, by the hypervisor, the operating system after initializing the virtual machine instance; and
after the operating system is resumed, using, by the hypervisor, the virtual machine instance to virtualize the physical resource to the operating system.

2. The computer-readable storage medium of claim 1, wherein the computer-readable storage medium is physical memory storage media.

3. The computer-readable storage medium of claim 1, wherein the computer-readable storage medium is physical memory media.

4. The computer-readable storage medium of claim 1, wherein the computer-readable storage medium is physical storage media.

5. The computer-readable storage medium of claim 1, further bearing computer-readable instructions that, upon execution by the computer, cause operations comprising:
launching, by the hypervisor, a second virtual machine instance for a second operating system;
launching the second operating system after the second virtual machine instance is launched; and
using, by the hypervisor, the second virtual machine instance to virtualize the physical resource to the second operating system.

6. The computer-readable storage medium of claim 1, further bearing computer-readable instructions that, upon execution by the computer, cause operations comprising:
creating, by the operating system, a temporary virtual machine instance;
initializing the temporary virtual machine instance with an instruction that generates an intercept;
resuming the temporary virtual machine instance after the act of initializing;
in response to detecting the intercept resulting from the act of resuming the temporary virtual machine instance, starting the temporary virtual machine instance to operate using hypervisor state.

7. The computer-readable storage medium of claim 6, further bearing computer-readable instructions that, upon execution by the computer, cause the computer to perform operations comprising:
prior to the creation of the temporary virtual machine instance, rendering inactionable any non-maskable interrupts.

8. The computer-readable storage medium of claim 6, further bearing computer-readable instructions that, upon execution by the computer, cause the computer to perform operations comprising:
after the temporary virtual machine instance is started using the hypervisor state:
launching the hypervisor; and
destroying the temporary virtual machine instance.

9. The computer-readable storage medium of claim 8, wherein one of the operating system and the hypervisor operates in 32-bit mode, while the other of the operating system and the hypervisor operates in 64-bit made.

10. The computer-readable storage medium of claim 8, wherein the operating system and the hypervisor operate using a different paging mechanism.

11. A method for using a running operating system to launch a hypervisor, comprising:
receiving, by a hypervisor and from a root operating system, information representing a physical resource detected by the operating system, the hypervisor and the root operating system executing on a computing system;
launching, by the hypervisor, a virtual machine instance for the root operating system;
pausing the operating system;
initializing the virtual machine with state consistent with the information representing the resource;
pausing the operating system;
launching, by the hypervisor, a virtual machine instance for the operating system;
initializing the virtual machine instance with state consistent with the state information;
resuming, by the hypervisor, the operating system after initializing the virtual machine instance; and
after the operating system is resumed, using, by the hypervisor, the virtual machine instance to virtualize the physical resource to the root operating system.

12. The method of claim 11, further comprising the following after the hypervisor is running:
launching one or more additional operating systems.

13. The method of claim 12, further comprising:
initiating a second virtual machine instance to interface with the second operating system.

14. A system for using a running operating system to launch a hypervisor, comprising:
a processor; and
a memory communicatively coupled to the processor when the system is operational, the memory bearing instructions that, upon execution by the processor, cause the system to at least:
receive, by a hypervisor, from a root operating system information representing a plurality of physical resources detected by the operating system;
launch, by the hypervisor, a virtual machine instance for the root operating system;
initialize the virtual machine with state consistent with the information representing the plurality of physical resources detected by the operating system;
pause the operating system;
launch, by the hypervisor, a virtual machine instance for the operating system;
initialize the virtual machine instance with the state information;
resume, by the hypervisor, the operating system after initializing the virtual machine instance; and
after the operating system is resumed, use, by the hypervisor, the virtual machine instance to virtualize the at least one physical resource to the root operating system.

15. The system of claim 14, wherein the memory further bears instructions that, upon execution by the processor, cause the system to at least:
launch, by the hypervisor, a second virtual machine instance for a second operating system;
launch the second operating system after the second virtual machine instance is launched; and
use, by the hypervisor, the second virtual machine instance to virtualize the physical resource to the second operating system.

16. The system of claim 14, wherein the memory further bears instructions that, upon execution by the processor, cause the system to at least:
creating, by the operating system, a temporary virtual machine instance;
initializing the temporary virtual machine instance with an instruction that generates an intercept;
resuming the temporary virtual machine instance after the act of initializing;

in response to detecting the intercept resulting from the act of resuming the temporary virtual machine instance, starting the temporary virtual machine instance to operate using hypervisor state.

17. The system of claim 16, wherein the memory further bears instructions that, upon execution by the processor, cause the system to at least:

prior to the creation of the temporary virtual machine instance, render inactionable any non-maskable interrupts.

18. The system of claim 16, wherein the memory further bears instructions that, upon execution by the processor, cause the system to at least:

after the temporary virtual machine instance is started using the hypervisor state:

launch the hypervisor; and destroy the temporary virtual machine instance.

19. The system of claim 14, wherein the memory further bears instructions that, upon execution by the processor, cause the system to at least:

launch, by the hypervisor, a second virtual machine instance for a second operating system;

launch the second operating system after the second virtual machine instance is launched; and use, by the hypervisor, the second virtual machine instance to virtualize the physical resource to the second operating system.

20. The method of claim 14, further comprising:

launching, by the hypervisor, a second virtual machine instance for a second operating system;

launching the second operating system after the second virtual machine instance is launched; and using, by the hypervisor, the second virtual machine instance to virtualize the physical resource to the second operating system.

* * * * *